United States Patent [19]

Mork

[11] 4,448,258
[45] May 15, 1984

[54] SOIL LEVELING APPARATUS

[76] Inventor: Orlan H. Mork, 6029 225th St. West, Farmington, Minn. 55024

[21] Appl. No.: 224,458

[22] Filed: Jan. 12, 1981

[51] Int. Cl.³ .............................................. A01B 49/02
[52] U.S. Cl. .................................. 172/197; 172/445.1
[58] Field of Search ............... 172/196, 197, 199, 200, 172/393, 445.1, 684.5, 699, 780, 784, 785, 799.5; 37/41, 48, 50; 52/730, 732; 404/106, 118, 119, 120

[56] References Cited

U.S. PATENT DOCUMENTS

| | | | |
|---|---|---|---|
| 1,833,878 | 11/1931 | Adams | 404/118 X |
| 2,302,702 | 11/1942 | Leschinsky | 172/197 |
| 2,578,131 | 12/1951 | Gannon | 172/136 |
| 2,762,140 | 9/1956 | Elfes | 172/445.2 |
| 2,817,203 | 12/1957 | Sievers et al. | 172/684.5 |
| 2,865,117 | 12/1958 | Davis et al. | 172/197 |
| 3,122,209 | 2/1964 | Crites | 172/197 X |
| 3,274,712 | 9/1966 | Jones | 172/197 |
| 3,274,713 | 9/1966 | Jones | 172/197 |
| 3,324,955 | 5/1967 | Perold | 172/684.5 |
| 3,556,228 | 1/1971 | Mork | 172/199 |
| 3,724,557 | 4/1973 | Boschung et al. | 172/785 |
| 3,904,380 | 9/1975 | Smith | 52/732 X |
| 4,196,778 | 4/1980 | Smith | 172/445.1 |
| 4,386,662 | 6/1983 | Kalif | 172/445.1 |

FOREIGN PATENT DOCUMENTS

| | | | |
|---|---|---|---|
| 1074994 | 4/1980 | Canada | 172/197 |
| 813809 | 5/1959 | United Kingdom | 172/445.1 |
| 849677 | 9/1960 | United Kingdom | 172/445.1 |

OTHER PUBLICATIONS

Gill Brochure.
Earthcavator Company Brochure.

Primary Examiner—Richard T. Stouffer
Attorney, Agent, or Firm—Merchant, Gould, Smith, Edell, Welter & Schmidt

[57] ABSTRACT

A soil leveling apparatus (10) is disclosed which includes a frame (11) having ground-engaging members (12a, 12b, 12c, 13) disposed transverse to the direction of motion, side rail members (14, 15) in which the ends of the ground-engaging members are secured, and upstanding connecting means (20) for operatively attaching the apparatus (10) to the draft vehicle. A scarifying means (50) for breaking up and loosening the soil prior to the leveling operation can be mounted near the forwardmost area of the apparatus (10). The scarifying means (50) includes a cross-shaft (51), connector arms (52) for pivotally connecting the cross-shaft (51) to the frame (11), scarifiers (55) extending downwardly from the cross-shaft (51) and a hydraulic cylinder (61) for lowering and raising the scarifying means (50) into and out of the soil.

21 Claims, 7 Drawing Figures

SOIL LEVELING APPARATUS

TECHNICAL FIELD OF THE INVENTION

This invention relates to the field of leveling devices and specifically to apparatuses for leveling soil and like materials.

BACKGROUND OF THE INVENTION

The present invention is an improvement of my "Apparatus for Leveling Soil and the Like," U.S. Pat. No. 3,556,228, issued Jan. 19, 1971. The patented apparatus attaches to a three-point hitch draft vehicle which provides variation between the front end of the apparatus and the rear end of the apparatus relative to the surface of the soil. The apparatus can thereby accommodate large quantities of loose soil and yet effectively level the ground's surface.

SUMMARY OF THE INVENTION

The present invention, while continuing to offer the angle variation benefits of my earlier patent, provides new structure and advantages which will expand the art in this field. The improvements include the use of continuous side rail members instead of rectangular tubing having individual side plates. The side rails with their continuous construction virtually eliminate the undesirable ridge formations possible with the use of rectangular tubing and individual side plates. Further, the continuous side rail members with their open interior design and unique connections with the transverse ground-engaging members lessen soil buildup along the interior sides of the apparatus and allow the soil to be better carried along those sides to the rear end of the apparatus.

Another improvement includes the provision of a scarifying means for breaking up and loosening the soil immediately prior to the leveling action of the apparatus. As will be explained in the description below, the scarifiers provide soil disturbance in compacted, bumpy areas in order to effectively level the surface of that area. The scarifying means is constructed to withstand significant twisting forces and operating strains, and yet it is easily accessible for replacement of broken parts or adjustment of the distances between the scarifiers when desired. The above improvements and other advantages will be further disclosed in the description which follows.

DESCRIPTION OF THE PREFERRED EMBODIMENT

Figure 1:
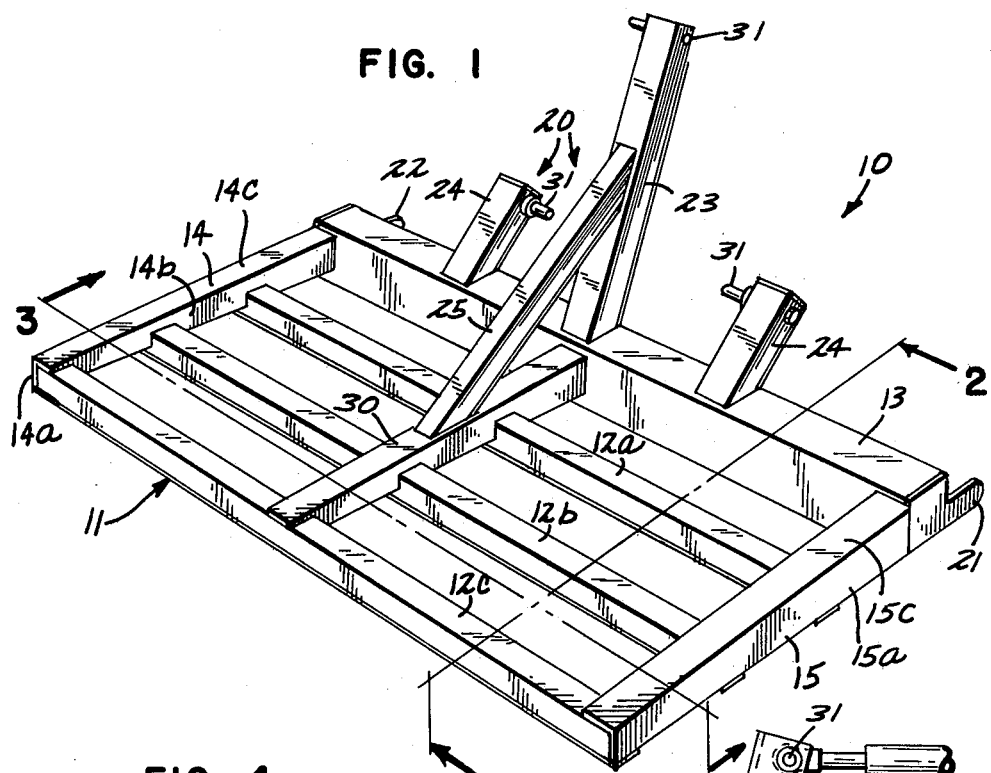
FIG. 1 is a perspective view of one embodiment of the present invention.

Referring now to the drawings, wherein like reference numerals are used throughout the several views to indicate like elements of the invention, there is disclosed a soil leveling apparatus 10 having a frame structure 11, side rails 14, 15, and connecting means 20 for operatively connecting the apparatus 10 to a draft means such as a three-point hitch vehicle or a skid-steer vehicle.

Referring now to FIG. 1, the frame 11 includes a number of rectangular cross-sectional, elongated members positioned transverse to the direction of motion. In the preferred embodiment, the forward most cross member 13 of inverted, generally U-shaped, double channel construction is followed by three other ground-engaging members 12a, 12b, 12c having generally rectangular cross sections with closed bottoms. Member 13 preferably has a substantially larger cross-sectional area than the other ground-engaging members 12a, 12b, 12c, although it could be the same size, and member 13 will be hereinafter identified as the scraper member 13. The lower or bottom surfaces of the ground-engaging members 12a, 12b, 12c and scraper member 13 lie generally in the same plane.

An elongated brace member 30 is connected to and extends generally along the top surfaces of the ground-engaging members 12a, 12b, 12c connecting at its forwardmost end with a central portion of the inner side surface of member 13. The brace member 30, as seen in FIG. 1, extends generally in the direction of motion and thus normal to the longitudinal axes of the ground-engaging members 12a, 12b, 12c and scraper member 13.

Fixedly attached to the frame 11 are a pair of side rail members 14, 15. Each side rail member has a continuous construction forming an elongated channel having two legs of unequal length and a top surface which preferably slopes downwardly from the forwardmost area of the apparatus near member 13. As can be seen in FIG. 1, the side rail members 14, 15 are connected to the frame 11 by securing the ends of the ground-engaging members 12a, 12b, 12c within the respective channels of the side rail members 14, 15. The forwardmost cross-sectional area of the side rail members 14, 15 are each secured, for example by welding, to a respective end portion of member 13.

Figure 3:
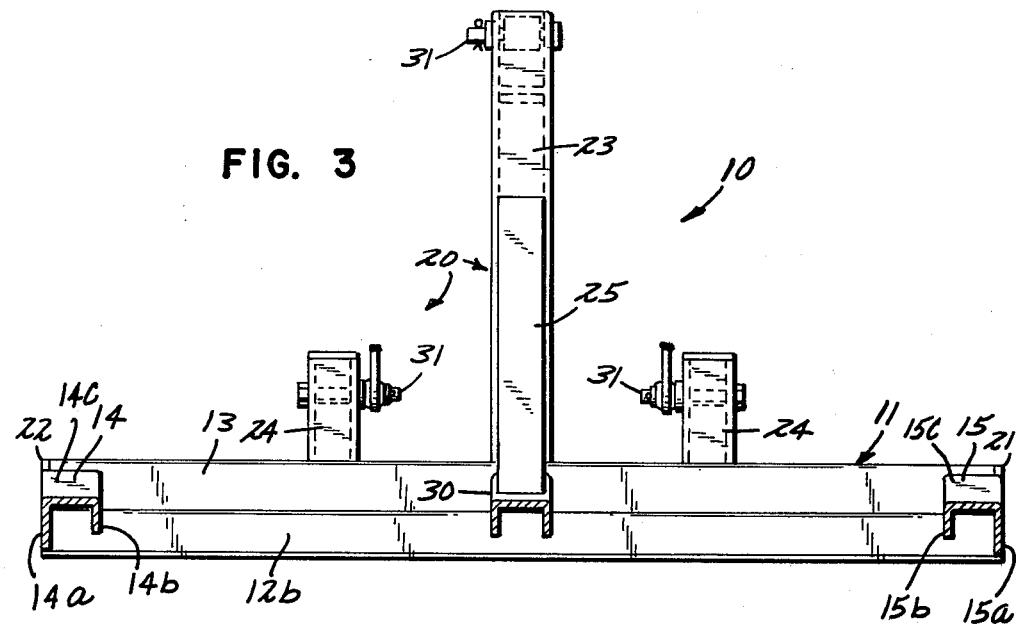
FIG. 3 is a cross-sectional view of the embodiment shown in FIG. 1 as seen along Line 3—3 in FIG. 1.

In the cross-sectional view of FIG. 3 the side rail members 14, 15 can be more clearly seen and understood. Each side rail member has a sloping top or upper surface 14c, 15c. Projecting downwardly from opposite edges of the top surfaces 14c, 15c are respective legs 14a, 14b, 15a, 15b, all of which have free edges, as can be seen in FIG. 3, which extend in the direction of motion generally parallel to the plane of the ground-engaging member lower surfaces. The outer legs 14a, 15a are significantly longer than the inner legs 14b, 15b in order to allow a better frame attachment to the new side rail members.

Figure 2:
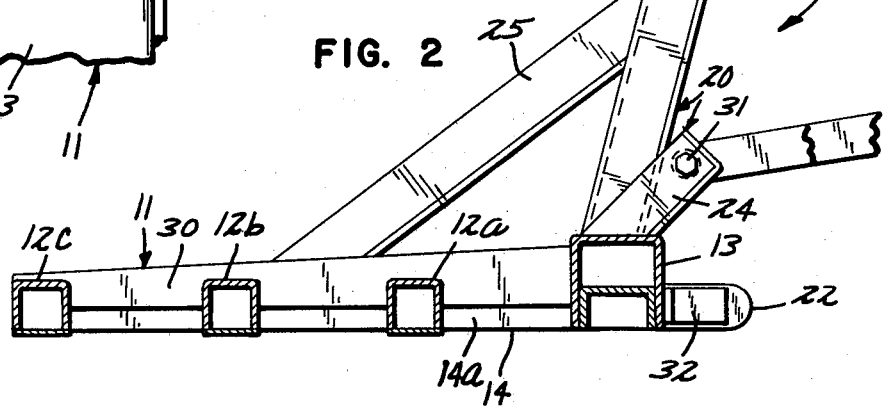
FIG. 2 is a cross-sectional view of the embodiment shown in FIG. 1 as seen along Line 2—2 in FIG. 1.

FIGS. 1, 2, and 3 when viewed together illustrate the improved means for attaching the frame's ground-engaging member 12b within side rail members 14 and 15. The following discussion will serve also as the explanation for securing the other ground-engaging members 12a, 12c within the side rail members 14, 15 as the procedure and results for all three securements are identical. As shown in FIG. 3, opposing ends of ground-engaging member 12b are fitted flush with the edges of the respective side rail member outer legs 14a, 15a. The ground-engaging member 12b is then appropriately secured by welding or other method to the respective legs 14a, 15a thereby forming strong butt-joint fits. The ground-engaging member 12b is also secured to the inner legs 14b, 15b of the respective side rail members. As can be seen in FIG. 1, a respective portion of each inner leg must be removed in order to obtain the placement of the entire cross-sectional area of the ground-engaging member ends flush against the outer legs. The removed portion of inner legs 14b, 15b fit over and around a portion of the ground-engaging member 12b and the two portions are then fixedly secured to each other by welding or similar method. The resulting arrangement is a notched-fit of the ground-engaging member with the inner legs of each side rail member.

When all of the ground-engaging members 12a, 12b, 12c are secured within and to the side rail members 14, 15 and the side rail members are respectively attached to the scraper member 13 the completed arrangement of the members with respect to each other becomes clear in the cross-sectional view of FIG. 2. The alignment of the lower surfaces of the ground-engaging members 12a, 12b, 12c and scraper member 13 is maintained for effective leveling action. The sloping top surface of each side rail member provides an open area above the upper surfaces of the end portions of the ground-engaging members wherein more soil can be carried away from the forwardmost area of the apparatus without substantial sticking of the soil in the joint corners.

Figure 4:
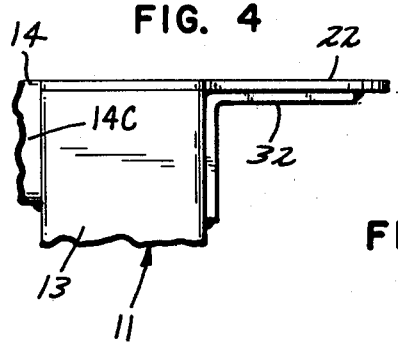
FIG. 4 is a fragmentary plan view of a portion of the embodiment shown in FIG. 1.

Attached at opposing ends of scraper member 13 is a retaining shoe member 21, 22. The shoe shape can be seen in FIG. 1 with a portion of the shoes 21, 22 projecting forward beyond member 13 in the direction of motion. To reinforce the free projecting portions of the shoes 21, 22 a right angle bracing plate 32 is provided for each shoe. FIG. 4 illustrates the positioning of the bracing plate 32 relative to member 13 and shoe 22. The positioning of an identical bracing plate relative to member 13 and shoe 21 would also be as shown in FIG. 4. The bracing plate is mounted by using any suitable method such as welding, riveting, etc.

The upstanding connecting means 20 shown in FIG. 1 is directed for attachment to a three-point hitch draft vehicle. The angled central beam 23 is generally vertical and has a lower end which is affixed to the frame 11 of the apparatus usually atop member 13. The free upper end of beam 23 is designed for attachment to the central link of a three-point hitch by a standard connection method shown at 31 in FIGS. 1, 2 and 3. Positioned proximate central beam 23 on either side are two shorter beams 24 which are generally vertical also. Each beam 24 has an end affixed to the frame 11, usually atop member 13, and has a free end constructed for attachment to the vertically adjustable lift arms of the three-point hitch. Again, standard connection means are used as designated by 31 in FIGS. 1, 2 and 3. To support the primary central beam 23, a strut or support beam 25 is provided having one end attached to a central portion of the rearward side of beam 23 and a second end attached to the top surface of the frame brace member 30 as shown in FIGS. 1 and 3. Again, any suitable beam attachment method can be used.

Figure 5:
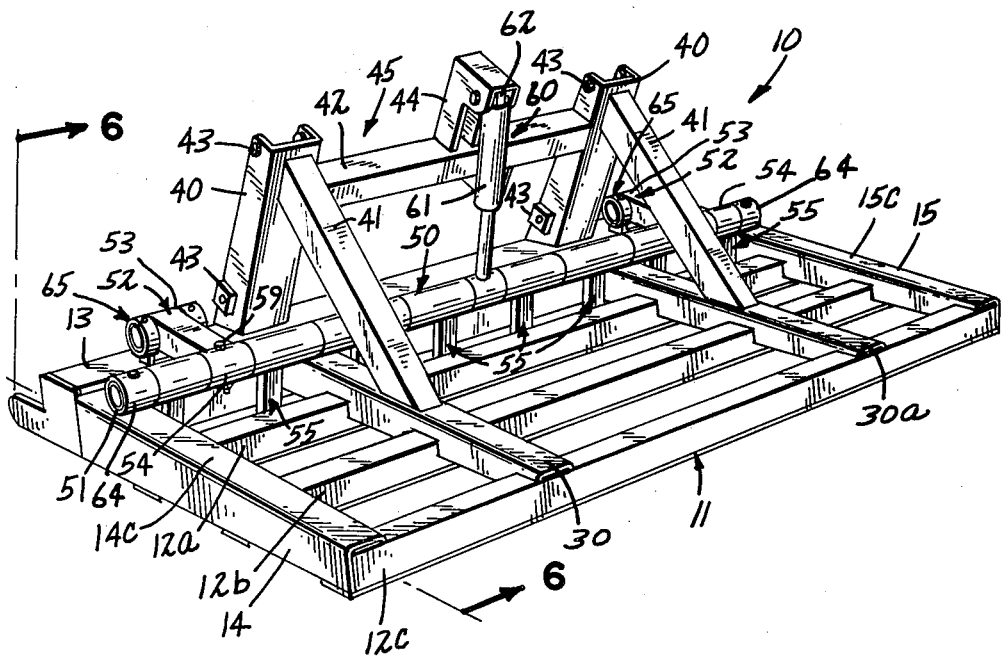
FIG. 5 is a perspective view of a second embodiment of the present invention.

The apparatus 10, as shown in FIG. 5, has a frame 11 and side rail members 14, 15 constructed in the manner discussed above for the embodiment shown in FIG. 1. The connecting means 45 in FIG. 5 is specifically constructed for attaching the apparatus 10 to a skid-steer type vehicle rather than a three-point hitch draft means. Additionally a scarifying means 50 is provided for breaking up and loosening the soil immediately prior to the leveling of the soil surface by the apparatus 10.

Figure 6:
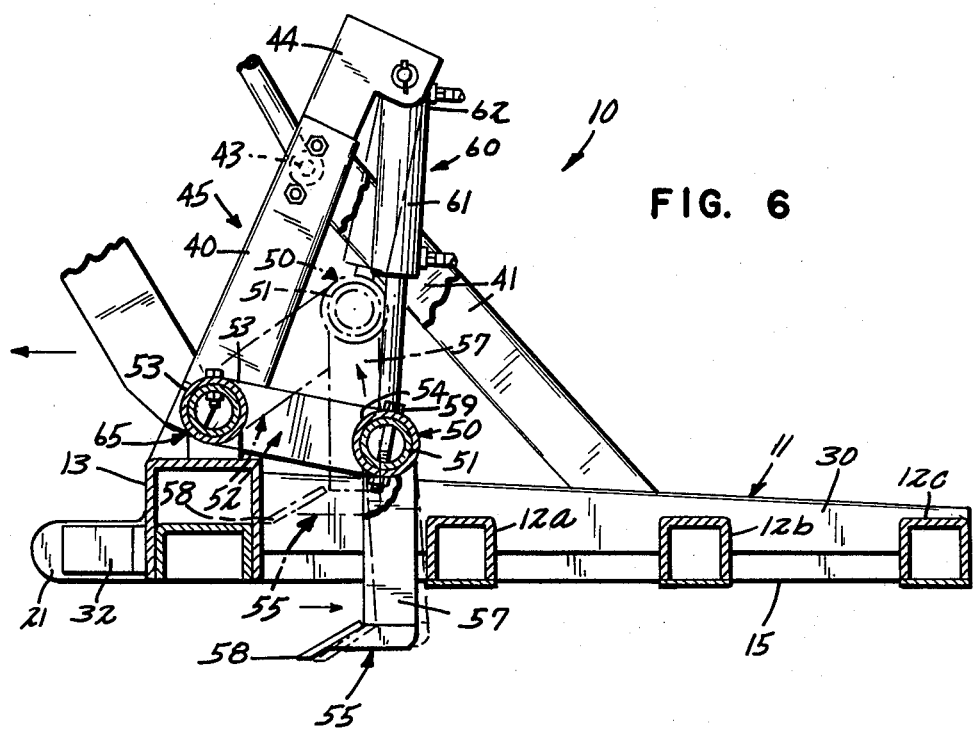
FIG. 6 is a cross-sectional view of the embodiment shown in FIG. 5 as seen along Line 6—6 in FIG. 5.
Figure 7:
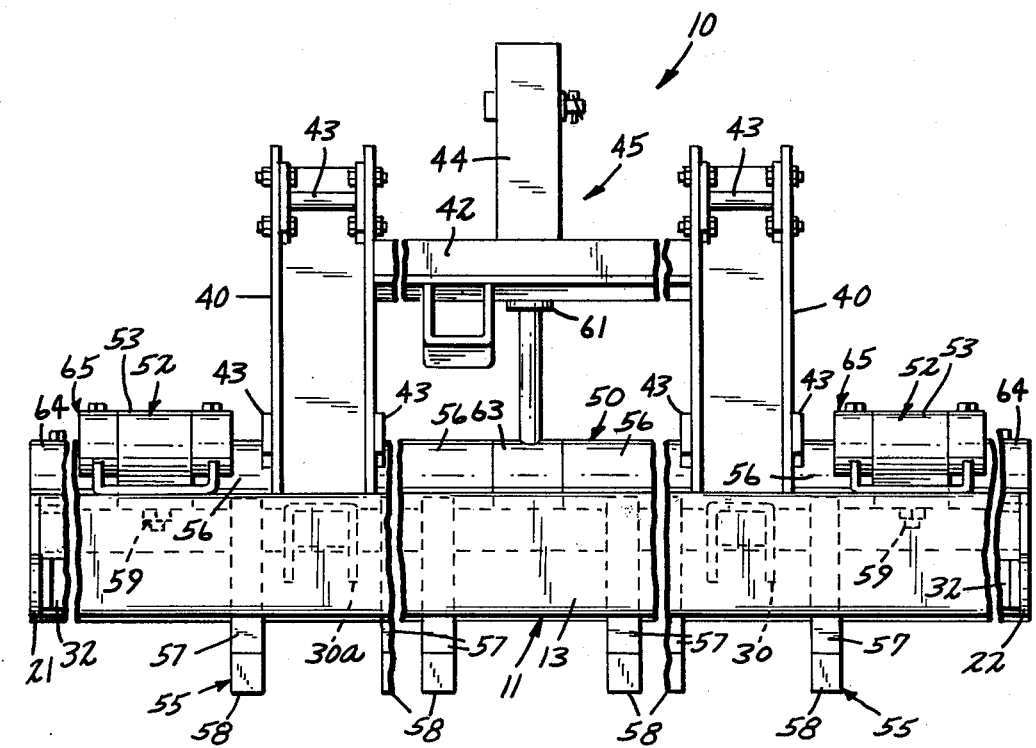
FIG. 7 is a front elevational view of the second embodiment as viewed in a direction from left to right in FIG. 6, with portions broken away for illustration purposes.

The connecting means 45 as shown in FIGS. 5, 6 and 7 includes two upstanding primary beams 40, slightly angled away from the skid-steer vehicle. The primary beams 40 are spaced apart and each has an end which is fixedly attached to the frame 11 generally along the top surface of scraper member 13. At the free end of each primary beam 40 and at a location proximate each beam's attachment to member 13 there are provided connectors 43 for operatively connecting the apparatus 10 to a skid-steer vehicle whereby the position of apparatus 10 can then be adjusted relative to the surface of the ground by controls located on the skid-steer vehicle. This connection is shown as pin devices in FIGS. 6 and 7. Each primary beam 40 has connected to a portion of its free end an end of a strut or support beam 41. The second end of each support beam 41 is fixedly attached to a respective frame bracing member 30, 30a. The support beams 41 are angled generally upward and towards the draft means. Further included in the connecting means 45 is a cross-beam 42 located intermediate the primary beams 40. The cross-beam 42 is secured at its ends to the respective primary beams 40. Positioned intermediate the beams 40 and mounted to the top surface of the cross-beam 42 is a generally vertical connector means 44 for operatively connecting a scarifying means to the cross-beam and thereby to the operating controls of the skid-steer vehicle.

The scarifying means 50 is usually positioned intermediate scraper member 13 and ground-engaging member 12a. The cross-shaft 51 of the scarifying means 50 lies transverse to the direction of motion. Its two free ends, having collars 64 as shown in FIG. 5, rest on respective sloping surfaces 14c and 15c of the side rail members when the scarifying means is in the operative position shown in FIG. 5.

A pair of connector arms 52 provide a means for attaching the cross-shaft to the frame 11 of the apparatus. Each connector arm 52 has a first end 53 and a second end 54. Each first end 53 has a cyclindrical shape and is pivotally connected to a respective mounting bracket means 65. Means 65 are each mounted upon the top surface of scraper member 13, as shown in FIGS. 6 and 7. Each second end 54 also has a cylindrical shape and is rigidly connected by suitable connecting means, such as pins, 59 to the cross-shaft 51, as illustrated clearly in FIG. 6.

Extending downwardly from the cross-shaft 51 are several scarifiers 55. Each scarifier 55, as can be seen in FIGS. 6 and 7, has an upper end 56, a central portion 57 and a tooth portion 58. Each upper end 56 is constructed to allow the passage of the cross-shaft 51 therethrough. The circular cross section of each end 56 allows the scarifier to swing freely relative to the cross-shaft 51 while being held directly upon the cross-shaft 51. A structural advantage of the scarifiers 55 is the ability to use the swinging aspect of the assembly to position the scarifiers into a small area as shown in FIG. 5. The central portion 57 of each scarifier is generally elongated and when in operation is generally vertically disposed and contacts the ground-engaging member 12a as shown in FIG. 6 thereby preventing the scarifier 55 from swinging rearwardly about the cross-shaft when the scarifying means is in its operative position. The scarifiers 55 are positioned apart from each other on the cross-shaft 51 by the axial dimension of the upper ends 56. Use of differing axial dimensions for the upper ends 56 or use of spacer elements, not shown, can vary the numbers of scarifiers 55 provided on the cross shaft 51. Each spacer has a circular cross-section and thus could be removably held around the cross-shaft 51. Thus, the design of the scarifiers 55 and the spacers, now shown, allows them to be easily removed from the cross-shaft in order to vary the scarifier spacing or to replace a broken scarifier by removing collars 64 and connector arm end pins 59 and sliding the elements off the cross-shaft and inserting the necessary spacers or new scarifiers.

An actuating means 60 can alternately lower the scarifying means 50 into an operative position and raise it into an inoperative position. The actuating means 60 includes a standard hydraulic cylinder 61, a lower end 63 engaging the cross-shaft 51 as seen in FIG. 5 and an upper end 62 which is connected in any standard manner to vertical member 44 as shown in FIGS. 5 and 6.

OPERATION OF THE PREFERRED EMBODIMENT

Operation of the apparatus 10 is effected through the control means of whichever type of draft vehicle is used, either a three-point hitch vehicle or a skid-steer vehicle. Use of either type of draft vehicle provides the source of power required to vary the angle at which the apparatus is held relative to the surface of the soil. The ability to vary the apparatus's operating angles allows the operator to level a particular surface more accurately and efficiently, with varying quantities of soil being accommodated by the apparatus.

The important aspects in the operation of the present invention are the advantages resulting from the use of continuous channel, side rail members rather than using rectangular tubing with individual side plates or other prior art arangements. The continuous side rail members 14, 15 prevent soil from escaping outward from the sides of the apparatus 10 and thereby prevents formation of ridges along the leveled surface. The bottom edge of each side rail member outer leg 14a, 15a acts as a skid to allow the apparatus to ride over an obstruction such as a tree root. This eliminates any "catching" of the apparatus by the obstruction and thereby significantly eliminates the problems of side plates being bent by such obstructions as rocks, buried objects, etc.

The open design as discussed earlier which results from the sloping upper surfaces 14c, 15c, the butt-joint and the notched-fit securements of the ground-engaging members 12a, 12b, 12c within side rail members 14, 15 greatly lessens soil spillage over the top surface of the side rail members. This open design allows more soil to be carried in the corners of the fittings by the outer legs 14a, 15a as well as lessening the amount of soil sticking in the joint corners because of the soil flow permitted within and along the side rail members 14, 15 and over the ground-engaging member ends.

The continuous length and vertical depth of the side rail members 14, 15 provide greater strength to the apparatus than is provided by individual side plates. Further, the sloping upper surface of each side rail member povides an increased cross-sectional area for attaching the side rail member 14, 15 to the scraper member 13. This increase in contact area provides an additional source of frame strength.

The cost of manufacture of the preferred embodiment will be less because of the smaller number of pieces involved in the fabrication process. Overall there is a better machine appearance with a continuous side rail construction. And, finally, the use of single retaining shoes at the forwardmost end of the apparatus provides the necessary structure for allowing only small amounts of soil to escape incrementally around the edge of the shoe without greatly affecting the leveling objective.

The scarifying assembly 50 has basically two operational aspects. In its raised position, as shown by the dotted lines in FIG. 6, the scarifying assembly 50 is in an inoperative position with the scarifiers 55 disengaged from the soil. The operative position of the scarifying assembly results when the hydraulic cylinder 61 lowers the assembly 50 to a position where the ends of the cross-shaft 51 rests upon the upper rail surfaces 14c, 15c and the tooth portions 58 of the scarifiers 55 enter into the soil. The cross-shaft 51, scarifiers 55, and connector arms 52 pivot from an operative to an inoperative position about the bracket means 65. The pinning connection 59 between the connector arm ends 54 and the cross-shaft 51 as seen in FIG. 6 substantially lessens the amount of twisting the scarifying assembly 50 undergoes as it is being raised.

As the apparatus 10 moves forward the engaged scarifiers 55 loosen up compacted soil areas and break up any individual chunks of soil in order to provide a soil consistency which can then be better leveled by the apparatus. The scarifiers traveling through the soil will be forced rearward causing strain upon both the cross-shaft and the hydraulic cylinder rod. The strain is lessened considerably by positioning the assembly within the frame whereby the scarifiers when forced rearward contact the front surface of ground-engaging member 12a as discussed above. And the cylinder strain is further lessened and the soil depth of the scarifiers controlled as the cross-shaft 51 rests upon the top surfaces 14c, 15c of the apparatus 10.

What is claimed is:

1. Apparatus for leveling soil and the like comprising:
   a frame including a plurality of elongated ground-engaging members fixedly attached with the longitudinal axes of said members extending generally transverse to the direction of motion, said members having lower surfaces lying generally in the same plane, and a scraper member attached to the forwardmost part of said frame, said scraper member having a lower surface lying generally in the same plane as said ground-engaging member lower surfaces;
   said frame further including a pair of side rail members, each said side rail member being of continuous construction extending along and connected to said scraper member and said ground-engaging members substantially normal thereto;
   each said side rail member including a top surface sloping in a downward direction from the area of attachment with said scraper member, a short inner leg, and a longer outer leg, both legs extending downwardly from said top surface, the bottom edges of said legs generally having no slope and lying substantially in the direction of motion; and
   connecting means rigidly attached to said frame for fastening said frame to a draft means for operation of said apparatus.

2. The apparatus according to claim 1 wherein said ground-engaging members are secured within said side rail member construction, said ground-engaging members each having two ends whereby each end is welded flush against a respective side rail member outer leg thereby forming a butt-joint arrangement, said securement further including a portion of each ground-engaging member connected to the respective side rail member inner leg portion by means including a notched-fit between said member portions.

3. Apparatus for leveling soil and the like comprising:
   a frame including a plurality of elongated ground-engaging members fixedly attached in longitudinally spaced-apart relationship with the longitudinal axes of said members extending generally transverse to the direction of motion, said members having lower surfaces lying generally in the same plane;
   a pair of opposite side rail members connected to said ground-engaging members, each said side rail member being of continuous construction and extending along a side of said frame, substantially normal to said ground-engaging members;
   each said side rail member having a top portion overlying portions of the ground engaging members, and leg portion with a lower edge extending in the direction of motion generally parallel to the plane of the lower surfaces of said ground engaging members;
   connecting means rigidly attached to said frame for fastening said frame to a draft means for operation of said apparatus;
   scarifying means mounted for vertical movement on said frame for breaking up and loosening the soil, said scarifying means comprising a plurality of depending scarifiers individually pivotal relative to said frame;
   the scarifiers of said scarifying means being commonly supported in laterally spaced apart relationship and depending adjacent to one of said ground engaging members which is positioned relative to said scarifiers to limit pivotal movement thereof; and
   means for selectively raising and lowering said scarifying means relative to the plane of said lower surfaces of said ground engaging members.

4. The apparatus according to claim 3 wherein said scarifying means includes:
   a cross-shaft proximate one of said ground-engaging members;
   a pair of connector arms, each arm having first and second ends, means for pivotally connecting said first end to said ground-engaging member, and means for connecting said second end to said cross-shaft;
   a plurality of scarifiers downwardly depending from said cross-shaft; and
   actuating means for lowering said cross-shaft to an operative position whereby said scarifiers are engaged and for raising said cross-shaft to an inoperative position whereby said scarifiers are not engaged.

5. The scarifying means according to claim 4 wherein said actuating means includes a hydraulic cylinder having an upper end connected to said frame and a lower end attached to said cross-shaft.

6. Apparatus for leveling soil and the like comprising:
   a frame including a plurality of elongated ground-engaging members fixedly attached with the longitudinal axes of said members extending generally transverse to the direction of motion, said members having lower surfaces lying generally in the same plane;
   a pair of opposite side rail members connected to said ground-engaging members, each said side rail member being of continuous construction and extending along a side of said frame, substantially normal to said ground-engaging members;
   each said side rail member having an upper surface sloping in a direction downward from the forwardmost area of said side rail member, each said side rail member further having a short inner leg and a longer outer leg each extending downwardly from said sloping upper surface with said outer legs each having a free bottom edge extending in the direction of motion generally parallel to said plane of said lower surfaces;
   connecting means rigidly attached to said frame for fastening said frame to a draft means for operation of said apparatus;
   scarifying means for breaking up and loosening the soil comprising a plurality of scarifiers movably attached to said frame; and
   means for raising and lowering said scarifying means above and below the plane of said lower surfaces of said ground engaging members.

7. The apparatus according to claim 6 wherein said ground-engaging members each have two opposing ends, each end being welded to a respective portion of one said side rail member outer leg, and a portion of each said ground-engaging member being welded in a notched-fit relationship with a respective portion of one said side rail member inner leg.

8. Apparatus for leveling soil and the like comprising:
   a frame including a plurality of elongated ground-engaging members fixedly attached with the longitdinal axes of said members extending generally transverse to the direction of motion, said members having lower surfaces lying generally in the same plane;
   a pair of opposite side rail members connected to said ground-engaging members, each said side rail member being of continuous construction and extending along a side of said frame, substantially normal to said ground-engaging members;
   connecting means rigidly attached to said frame for fastening said frame to a draft means for operation of said apparatus;
   scarifying means for breaking up and loosening the soil comprising a plurality of scarifiers movably attached to said frame;
   said scarifying means including:
   a cross-shaft proximate one of said ground-engaging members;
   a pair of connector arms, each said arm having first and second ends, means for pivotally connecting said first end to said ground-engaging member, and means for connecting said second end to said cross-shaft;
   a plurality individually pivotal of scarifiers downwardly depending from said cross-shaft adjacent to one of said ground engaging members, which one of said ground engaging members is positioned relative to said scarifiers to limit pivotal movement thereof;
   said scarifiers each including an elongated central portion having at one end a tooth element for engaging the soil and having at its other end a tubular member through which said cross-shaft passes whereby said scarifier is pivotally retained upon said cross-shaft;

means for raising and lowering said scarifying means relative to the plane of said lower surfaces of said ground engaging members.

9. Apparatus for leveling soil and the like comprising:

a frame including a plurality of elongated ground-engaging members fixedly attached with the longitudinal axes of said members extending generally transverse to the direction of motion, said members having lower surfaces lying generally in the same plane;

a pair of opposite side rail members connected to said ground-engaging members, each said side rail member being of continuous construction and extending along a side of said frame, substantially normal to said ground-engaging members;

connecting means rigidly attached to said frame for fastening said frame to a draft means for operation of said apparatus;

scarifying means for breaking up and loosening the soil comprising a plurality of scarifiers movably attached to said frame;

said scarifying means including;

a cross-shaft proximate one of said ground-engaging members;

a pair of conductor arms, each arm having first and second ends, means for pivotally connecting said first end to said ground-engaging member, and means for connecting said second end to said cross-shaft;

a plurality of individually pivotal scarifiers downwardly depending from said cross-shaft adjacent to one of said ground engaging members, which one of said ground engaging members is positioned relative to said scarifiers to limit pivotal movement thereof;

said scarifiers being pivotally mounted on said cross-shaft, and wherein means are provided to block rearward movements of said scarifiers about said shaft when said scarifiers are engaged;

means for raising and lowering said scarifying means relative to the plane of said lower surfaces of said ground engaging members.

10. Apparatus for leveling soil and the like comprising:

a frame including a plurality of elongated ground-engaging members fixedly attached in longitudinal axes of said members extending generally relationship with the longitudinally spaced-apart generally transverse to the direction of motion, said members having lower surfaces lying generally in the same plane;

a pair of opposite side rail members connected to said ground-engaging members, each side rail member being of continuous construction and extending along a side of said frame, substantially normal to said ground-engaging members;

connecting means rigidly attached to said frame for fastening said frame to a draft means for operation of said apparatus;

scarifying means mounted for vertical movement on said frame for breaking up and loosening the soil, said scarifying means comprising a plurality of scarifiers individually and freely pivot relative to said frame;

said scarifying means including:

a cross-shaft proximate one of said ground-engaging members;

a pair of connector arms, each arm having first and second ends, means for pivotally connecting said first end to said ground-engaging member, and means for connecting said second end to said cross-shaft;

a plurality of scarifiers downwardly depending from said cross-shaft;

actuating mean for selectively lowering said cross-shaft to an operative position whereby said scarifiers are engaged with the soil, and for raising said cross-shaft to an inoperative position whereby said scarifiers are not engaged;

said scarifiers being pivotally mounted on the cross-shaft; and means for blocking rearward movements of said scarifiers about said shaft when said scarifiers are engaged;

said blocking means consisting of said scarifiers being positioned to contact one of said ground-engaging members to block said rearward movements thereof.

11. Apparatus for leveling soil and the like comprising:

a frame including a plurality of elongated ground-engaging members fixedly attached with the longitudinal axes of said members extending generally transverse to the direction of motion, said members having lower surfaces lying generally in the same plane;

a pair of opposite side rail members connected to said ground-engaging members, having lower surfaces lying generally in the same plane;

a pair of opposite side rail members connected to said ground-engaging members, each said side rail member being of continuous construction and extending along a side of said frame, substantially normal to said ground-engaging members;

connecting means rigidly attached to said frame for fastening said frame to a draft means for operation of said apparatus;

scarifying means for breaking up and loosening the soil comprising a plurality of scarifiers movably attached to said frame;

said scarifying means including:

a cross-shaft;

means for mounting said cross-shaft on said frame to permit generally upward and downward movement thereof;

a plurality of downwardly depending scarifiers individually pivotally mounted on said cross-shaft; a portion of said frame spaced from said cross-shaft being positioned relative to said scarifiers to block rearward movements of said scarifiers about said cross-shaft; and means for raising and lowering said scarifying means relative to the plane of said lower surfaces of said ground engaging members.

12. Apparatus for leveling soil and the like comprising:

a frame including a plurality of elongated ground-engaging members fixedly attached with the longitudinal axes of said members extending generally transverse to the direction of motion, said members having lower surfaces lying generally in the same plane;

a pair of side rail members, each side rail member being of continuous construction connected to said ground-engaging members and extending substantially normal thereto;

each said side rail member being of generally channel-like configuration with a top surface which slopes downwardly from the forwardmost ground engaging member, and downwardly depending inner and outer legs, the outer leg being substantially coplanar at its lower edge with the lower surfaces of said ground-engaging members, the lower edges of said outer legs generally having no slope relative to said forwardmost ground engaging member; and connecting means rigidly attached to said frame for fastening said frame to a draft means for operation of said apparatus.

13. The apparatus according to claim 12 further including a scarifying means for breaking up and loosening the soil comprising a plurality of scarifiers attached to said frame and extending below the plane of said lower surfaces of said ground-engaging members.

14. The apparatus according to claim 13 wherein said scarifying means includes:

a cross-shaft;

a pair of connector arms, each arm having first and second ends, means for pivotally connecting said first end to said scraper member, and means for pivotally connecting said second end to said cross-shaft;

a plurality of scarifiers downwardly depending from said cross-shaft; and actuating means for lowering said cross-shaft to an operative position whereby said scarifiers are engaged, and for raising said cross-shaft to an inoperative position whereby said scarifiers are not engaged with the soil.

15. The scarifying means according to claim 14 wherein said actuating means includes a hydraulic cylinder having an upper end connected to said frame and a lower end connected to said cross-shaft.

16. Apparatus for leveling soil and the like comprising:

a frame including a plurality of elongated ground-engaging members fixedly attached with the longitudinal axes of said members extending generally transverse to the direction of motion, said members having lower surfaces lying generally in the same plane;

a pair of side rail members, each said side rail member being of continuous construction connected to said ground-engaging members and extending substantially normal thereto;

each said side rail member comprising a channel member having a top surface, a short inner leg, and a longer outer leg extending downwardly from said top surface and generally in the direction of motion;

a majority of said ground-engaging members being secured within said side rail channel members, said secured ground-engaging members each having two opposing ends welded flush against a respective side rail member outer leg in a butt-joint relationship, further having a portion connected to a portion of the inner leg of said respective side rail member by means including a notched-fit between said member portions; and connecting means rigidly attached to said frame for fastening said frame to a draft means for operation of said apparatus.

17. Apparatus for leveling soil and the like comprising:

a frame including a plurality of elongated ground-engaging members fixedly attached with the longitudinal axes of said members extending generally transverse to the direction of motion, said members having lower surfaces lying generally in the same plane;

a pair of side rail members, each said side rail member being of continuous construction connected to said ground-engaging members and extending substantially normal thereto;

each said side rail member comprising a channel member having a top surface, a short inner leg, and a longer outer leg extending downwardly from said top surface and generally in the direction of motion;

said side rail members each having a top surface which slopes downwardly from the connection of said side rail member to the forwardmost ground-engaging member, said forwardmost ground-engaging member being a scraper member having a cross-sectional area substantially larger than the other ground-engaging members, and further, each said longer outer leg of said side rail members having a free edge extending generally parallel to said plane of ground-engaging member lower surfaces; and connecting means rigidly attached to said frame for fastening said frame to a draft means for operation of said apparatus.

18. Apparatus for leveling soil and the like comprising:

a frame including a plurality of elongated ground-engaging members fixedly attached with the longitudinal axes of said members extending generally transverse to the direction of motion, said members having lower surfaces lying generally in the same plane;

a pair of side rail members, each said side rail member being of continuous construction connected to said ground-engaging members and extending substantially normal thereto;

scarifying means for breaking up and loosening the soil comprising a plurality of scarifiers attached to said frame and extending below the plane of said lower surfaces of said ground-engaging members;

said scarifying means including:

a cross-shaft;

a pair of connector arms, each arm having first and second ends, means for pivotally connecting said first end to said frame, and means for pivotally connecting said second end to said cross-shaft;

a plurality of scarifiers downwardly depending from said cross-shaft;

actuating means for lowering said cross-shaft to an operative position whereby said scarifiers are engaged, and for raising said cross-shaft to an inoperative position whereby said scarifiers are not engaged with the soil;

said scarifiers each including an elongated central portion which contacts the ground-engaging member immediately rearward said scarifying means whereby rearward swinging movement of said scarifiers is substantially limited when said scarifiers are engaged, a tooth element for engaging the soil at the lower end of each scarifier, and a tubular member at the upper end through which said cross-shaft passes whereby said scarifier is retained upon said cross-shaft; and connecting means rigidly attached to said frame for fastening said frame to a draft means for operation of said apparatus.

19. Apparatus for leveling soil and the like comprising;

a rigid frame including a forwardmost cross member adapted to be attached to a draft means and at least one elongated ground-engaging member, with the longitudinal axes of said members extending generally transverse to the direction of motion, and a pair of continuous side rails connected to said members substantially normal thereto;

scarifying means for breaking up and loosening the soil comprising a plurality of scarifiers movably attached to said frame and extending between said members;

said scarifying means including:

a cross-shaft extending generally transverse to the direction of motion;

a plurality of connector arms, each arm having first and second ends, means for pivotally connecting said first end of said cross member, and means for connecting said second end to said cross-shaft;

a plurality or scarifiers pivoted to and downwardly depending from said cross-shaft between an adjacent pair of said cross and ground-engaging members which are positioned relative to said scarifiers to limit pivotal movement of said scarifiers in at least one direction about said cross-shaft;

said scarifiers each including an elongated central portion being adapted at one end for engaging the soil and having at its other end a tubular member through which said cross-shaft passes whereby said scarifier is pivotally retained upon said cross-shaft and means for raising and lowering said scarifying means.

20. Apparatus for leveling soil and the like comprising;

a rigid frame including a forwardmost cross member adapted to be attached to a draft means and at least one elongated ground-engaging member, with the longitudinal axes of said members extending generally transverse to the direction of motion, and a pair of continuous side rails connected to said members substantially normal thereto;

scarifying means for breaking up and loosening the soil comprising a plurality of scarifiers movably attached to said frame and extending between said members;

said scarifying means including:

a cross-shaft extending generally transverse to the direction of motion;

a plurality of connector arms, each having first and second ends, means for pivotally connecting said first end to said cross member, and means for connecting said second end to said cross-shaft;

a plurality of scarifiers downwardly depending from said cross-shaft between said cross and ground-engaging members;

said scarifiers being individually pivotally mounted on said cross-shaft, and wherein said cross and ground-engaging members are relatively positioned such that said ground-engaging members block rearward movements of said scarifiers about said shaft when said scarifiers are engaged;

actuating means for lowering said cross-shaft to an operative position whereby said scarifiers are engaged with the ground and for raising said cross-shaft to an inoperative position whereby said scarifiers are not engaged; and means for raising and lowering said scarifying means relative to said frame.

21. Apparatus for leveling soil and the like comprising;

a rigid frame including a forwardmost cross member adapted to be attached to a draft means and at least one elongated ground-engaging member, with the longitudinal axes of said member extending generally transverse to the direction of motion, and a pair of opposite side rails connected to said members substantially normal thereto;

each said side rail being of continuous construction and including a top portion overlying portions of the ground-engaging members, and a leg portion substantially coplanar at its lower edge with the lower surface of said ground-engaging member;

scarifying means for breaking up and loosening the soil comprisiing a plurality of scarifiers movably attached to said frame and extending between said members; and means for raising and lowering said scarifying means;

said scarifying means including:

a cross-shaft extending generally transverse to the direction of motion;

a plurality of connector arms, each arm having first and second ends, means for pivotally connecting said second end to said cross-section;

a plurality of scarifiers downwardly depending from said cross-shaft between said cross and ground-engaging members;

said scarifiers being pivotally mounted on said cross-shaft; and means for blocking rearward movements of said scarifiers about said shaft when said scarifiers are engaged with the soil;

said blocking means consisting of said scarifiers being positioned to contact said ground-engaging member to block said rearward movements thereof.

* * * * *

UNITED STATES PATENT AND TRADEMARK OFFICE
CERTIFICATE OF CORRECTION

PATENT NO. : 4,448,258
DATED : May 15, 1984
INVENTOR(S) : Orlan H. Mork

It is certified that error appears in the above-identified patent and that said Letters Patent are hereby corrected as shown below:

Column 5, line 62, "povides" should be --provides--;

Column 8, line 12, delete "bottom";

Column 8, line 57, "a plurality individually pivotal of scarifiers down-" should read --a plurality of individually pivotal scarifiers down--;

Column 9, lines 47-49, "engaging members fixedly attached in longitudinal axes of said members extending generally relationship with the longitudinally spaced-apart generally" should read --engaging members fixedly attached with the longitudinal axes of said members extending generally--;

Column 10, line 8, "mean" should be --means--;

Column 14, line 34, "comprisiing" should be --comprising--;

Column 14, line 43, "cross-section" should be --cross-shaft--.

Signed and Sealed this

Twenty-seventh Day of November 1984

[SEAL]

Attest:

GERALD J. MOSSINGHOFF

*Attesting Officer*  *Commissioner of Patents and Trademarks*